(12) United States Patent
Bernardinis

(10) Patent No.: US 10,999,053 B2
(45) Date of Patent: *May 4, 2021

(54) BAUD-RATE TIME ERROR DETECTOR

(71) Applicant: INPHI CORPORATION, Santa Clara, CA (US)

(72) Inventor: Fernando De Bernardinis, Santa Clara, CA (US)

(73) Assignee: INPHI CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,075

(22) Filed: Jul. 8, 2020

(65) Prior Publication Data

US 2020/0344037 A1 Oct. 29, 2020

Related U.S. Application Data

(63) Continuation of application No. 16/358,687, filed on Mar. 19, 2019, now Pat. No. 10,749,662.

(51) Int. Cl.
*H04L 7/027* (2006.01)

(52) U.S. Cl.
CPC .................... *H04L 7/027* (2013.01)

(58) Field of Classification Search
CPC .. H04B 2001/70706; H04L 2027/0055; H04L 27/0014; H04L 7/0079; H04L 7/00
See application file for complete search history.

(56) References Cited

U.S. PATENT DOCUMENTS 10,749,662 B1 * 8/2020 De Bernardinis .... H04L 7/0062
2016/0352557 A1 * 12/2016 Liao ..................... H04L 27/3809

OTHER PUBLICATIONS

Mueller, K., et al., "Timing Recovery in Digital Synchronous Data Receivers," IEEE Transactions on Communications, May 1976, pp. 516-531, vol. COM-24, No. 5, can be retrieved at <URL: https://lpdfs.semanticscholar.org/efOa/539a61e05df52faeeeb8ca408e2f1257 5a8b.pdf>.

* cited by examiner

*Primary Examiner* — David S Huang
(74) *Attorney, Agent, or Firm* — Richard T. Ogawa; Ogawa P.C.

(57) ABSTRACT

A receiver system that includes a clock and data recovery (CDR) system for aligning a local clock signal to an incoming data signal to extract correct timing information from the incoming data signal is provided. A timing error detector generates an output phase error signal representing the phase difference between the incoming data signal and the local clock signal. The timing error detector determines the phase difference according to recovered symbols and the difference between the recovered symbols and digital samples of the incoming data signal. The digital samples of the incoming data signal include intersymbol interference. The output timing information is suitable for aligning the local clock signal to the incoming data signal.

18 Claims, 3 Drawing Sheets

BAUD-RATE TIME ERROR DETECTOR

CROSS-REFERENCE TO RELATED APPLICATIONS

This application claims priority to and is a continuation of U.S. patent application Ser. No. 16/358,687, filed on Mar. 19, 2019, which is incorporated by reference herein.

BACKGROUND

FIELD OF THE DISCLOSURE

This disclosure pertains in general to digital receiver, and more specifically to timing error detection.

DESCRIPTION OF THE RELATED ART

One of the important functions of communication receivers is to maintain symbol synchronization. In a digital receiver, clock and data recovery (CDR) systems are used to recover the clock and data from a received signal. The received signal should be sampled at the accurate timing instants to recover the data. To accurately recover the data, some CDR systems double sample the received signal at the local clock signal. That is, two samples are taken in each period. However, in systems that cannot afford double sampling the received signal, the local clock signal is inferred from ISI (intersymbol interference) content of the sampled data. The local clock signal is locked if the ISI content of the previous sample equals to the ISI content of the next sample. In these systems, if the ISI content is too low, the difference between ISI content of the previous sample and the next sample may be too small and unreliable, which results in loss of symbol synchronization. As a result, an improved timing error detection is needed to accurately track and correct any substantial deviation or drift in the clock signal.

SUMMARY

A receiver system that includes a clock and data recovery (CDR) system for aligning a local clock signal to an incoming data signal to extract correct timing information from the incoming data signal is provided. A timing error detector generates an output phase error signal representing the phase difference between the incoming data signal and the local clock signal. The timing error detector determines the phase difference according to recovered symbols and the difference between the recovered symbols and digital samples of the incoming data signal. The digital samples of the incoming data signal include intersymbol interference. The output timing information is suitable for aligning the local clock signal to the incoming data signal.

Other aspects include components, devices, systems, improvements, methods, processes, applications and other technologies related to the foregoing.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
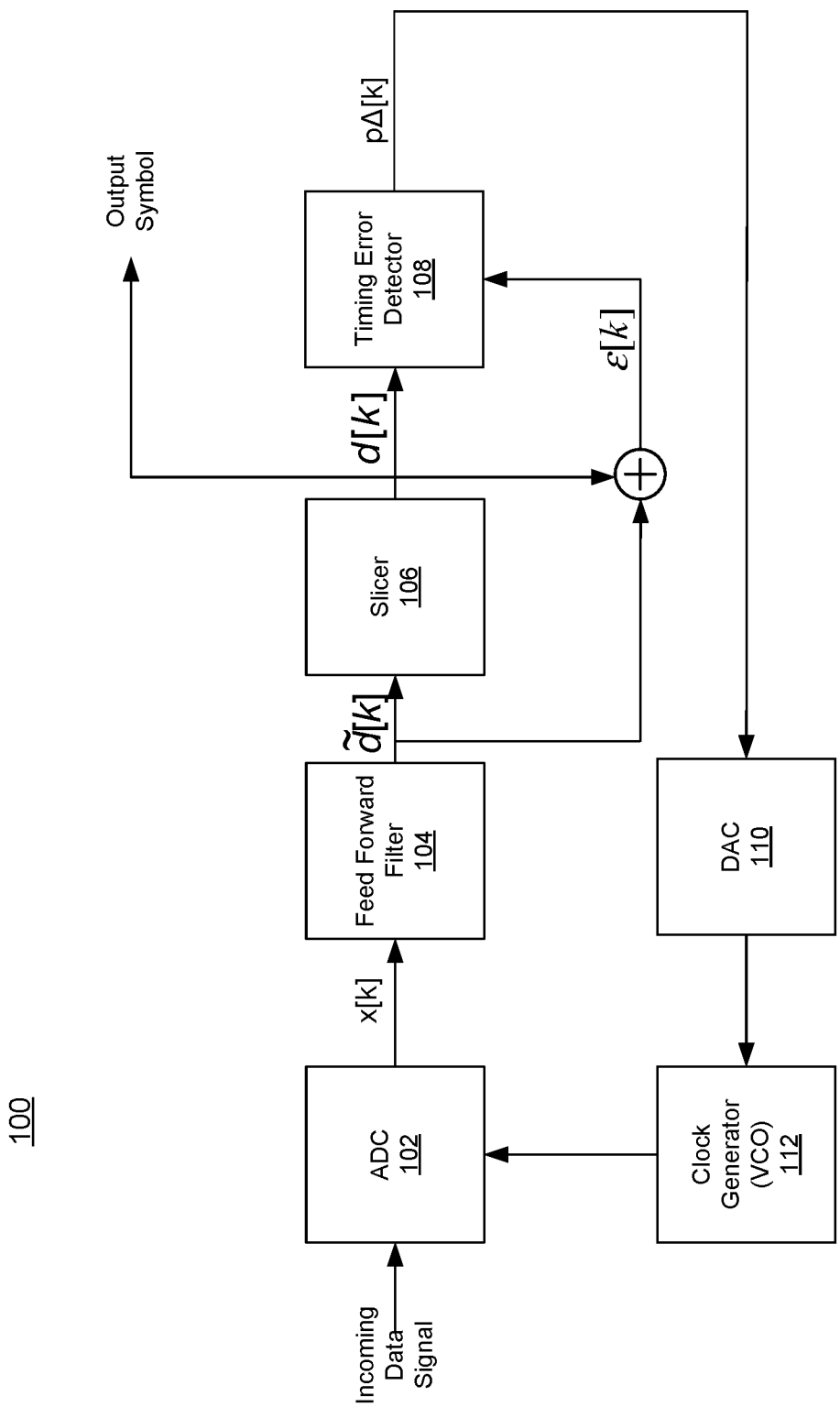
FIG. 1 is a block diagram illustrating an example receiver system 100 for recovering transmitted data from a received data signal, according to one embodiment.

FIG. 1 is a block diagram illustrating an example receiver system 100 for recovering transmitted data from a received data signal, according to one embodiment. The receiver system 100 receives an incoming data signal and outputs symbols $\hat{d}[k]$. The receiver system 100 includes an analog to digital converter (ADC) 102, a feed forward filter 104, a slicer 106, a timing error detector (TED) 108, a digital to analog converter (DAC) 110, and a clock generation (VCO) 112. The ADC 102 converts an incoming analog data signal to a digital signal x[k]. The digital signal x[k] includes the data signal and noise. The ADC 102 is driven by a local clock signal, generated in this example by the clock generator 112. The sample can be taken at a rising edge or a falling edge of the clock signal. The incoming data signal is the baseband signal representing one or more symbols. The one or more symbols are modulation symbols that are modulated onto a carrier signal. The digital signal x[k] is a series of samples of the baseband signal.

The feedforward filter 104 conditions the digital signal x[k] by mitigating intersymbol interference and provides the filtered signal $\tilde{d}[k]$ to the slicer 106. The slicer 106 determines a symbol d[k] associated with the digital signal $\tilde{d}[k]$. Compared to the filtered signal $\tilde{d}[k]$ that may be affected by ISI (intersymbol interference) and noise, the symbol d[k] is one entry of the symbol alphabet.

The local clock signal ideally is synchronized to the incoming data signal. However, in the receiver system 100, the local clock signal is generated locally by the clock generator 112. The local clock signal is synchronized to the incoming data signal by a feedback loop which in this example includes the timing error detector 108.

The TED 108 detects the phase difference between the incoming data signal and the local clock signal. The TED 108 generates an output phase error signal representing the phase difference between the incoming data signal and the local clock signal. The phase error signal may indicate whether the local clock signal is leading or lagging the incoming data signal. In various embodiments, the TED 108 determines the phase difference based on the symbol d[k] recovered at a time k and the difference signal ε[k]. The difference signal is the difference between the filtered signal $\tilde{d}[k]$ that is used to recover the symbol d[k] and the recovered symbol d[k]. The output phase error signal is provided to a Digital to Analog Converter (DAC) 110 to generate a voltage signal. The output phase error signal may be filtered by a loop filter (not shown) before being provided to the DAC 110. The voltage signal is applied as an input to the clock generator 112. The clock generator 112 may include a voltage-controlled oscillator (VCO) with variable frequency capability. The clock generator 112 adjusts the local clock signal according to the control voltage.

The feedback loop may further include a loop filter (not shown) that controls the frequency range of an incoming data signal to which a local clock signal can lock and how fast the local clock signal locks to the incoming data signal. The loop filter determines the stability of the feedback loop. In some embodiments, the feedback loop may include a frequency changing element such as a frequency divider, a frequency multiplier, and/or a mixer such that the output of the clock generator 112 is locked to a reference signal which has a frequency that is a multiple or a sub-multiple of the frequency of the incoming data signal.

The receiver system 100 may further include other components such as an antenna, a preprocessor, an analog equalizer, variable gain amplifiers and a Decision Feedback Loop. The receiver system 100 may be a part of a device such as a network switch, an optical module, a hard disk interface, a high speed computer interface, a digital video processing device.

Figure 2:
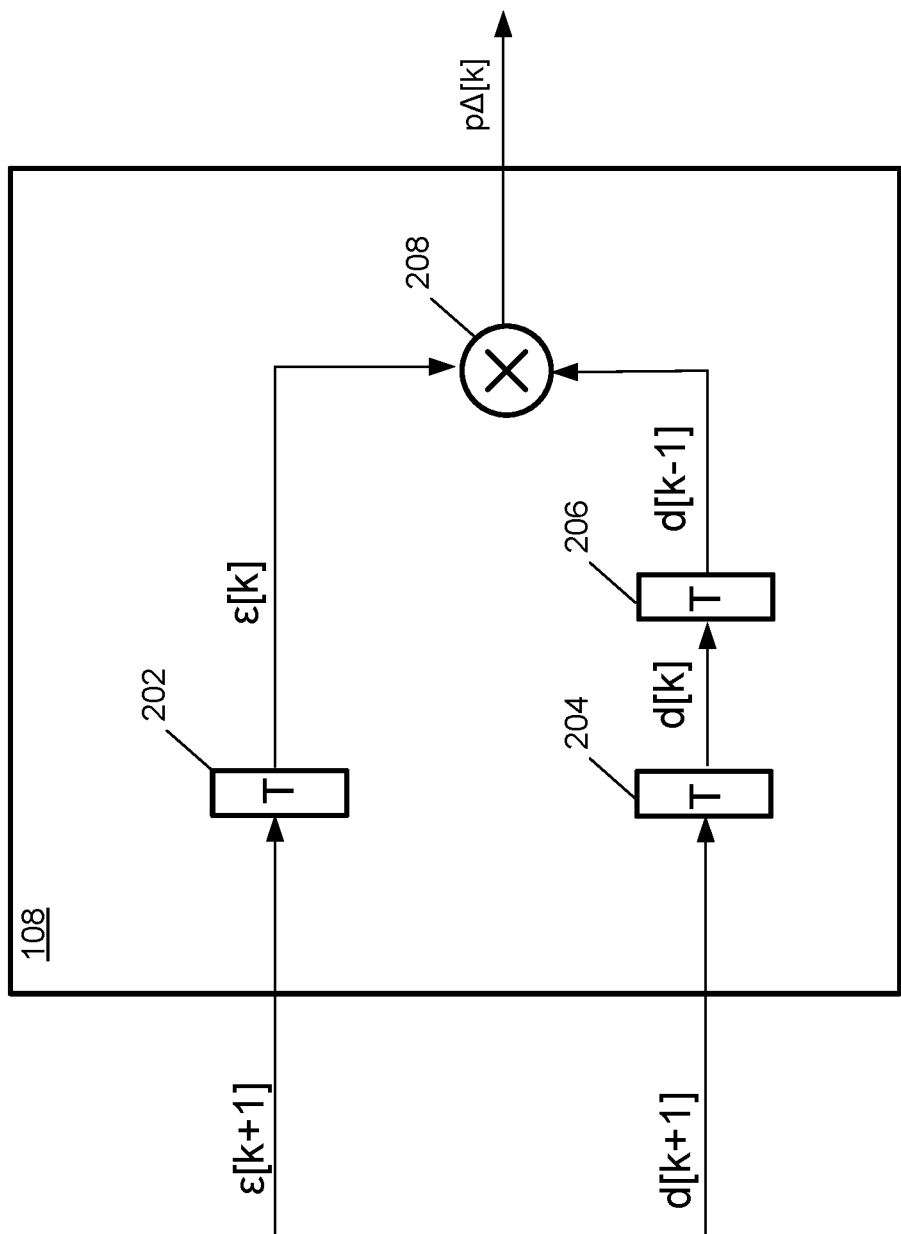
FIG. 2 is a block diagram illustrating an example TED, suitable for use in the receiver system 100 of FIG. 1.

FIG. 2 is a block diagram illustrating an example of the TED 108, suitable for use in the receiver system 100 of FIG. 1. The example TED 108 receives a first input signal d[k] that is the symbol recovered at a time k, and a second input signal ε[k] that is the difference between the filtered signal $\tilde{d}$[k] used to recover the symbol d[k] and the recovered symbol d[k]. The TED 108 includes delay elements 202, 204, 206, and a multiplier 208. The first delay element 202 is coupled to the input terminal and stores the input signal ε[k] for a symbol time period T. The second delay element 204 and the third delay element 206 are coupled in series and coupled to the second input terminal along the signal path for the input signal d[k]. The second delay element 204 and the third delay element 206 each store the input signal d[k] for a symbol time period T. At a given time k, the multiplier 208 multiplies the signal ε[k] and the d[k−1]. The TED 108 determines the phase difference according to Equation (1):

$$p\Delta[k]=(d[k]-\tilde{d}[k])*d[k-1]-S_{TH} \quad (1),$$

where $S_{TH}$ is a sampling threshold. In the illustrated example, the sampling threshold is 0.

In other embodiments, the TED 108 may determine the phase difference according to Equation (2):

$$p\Delta[k]=(d[k]-\tilde{d}[k])* d[k+1]-S_{TH} \quad (2),$$

where $S_{TH}$ is a sampling threshold.

Figure 3:
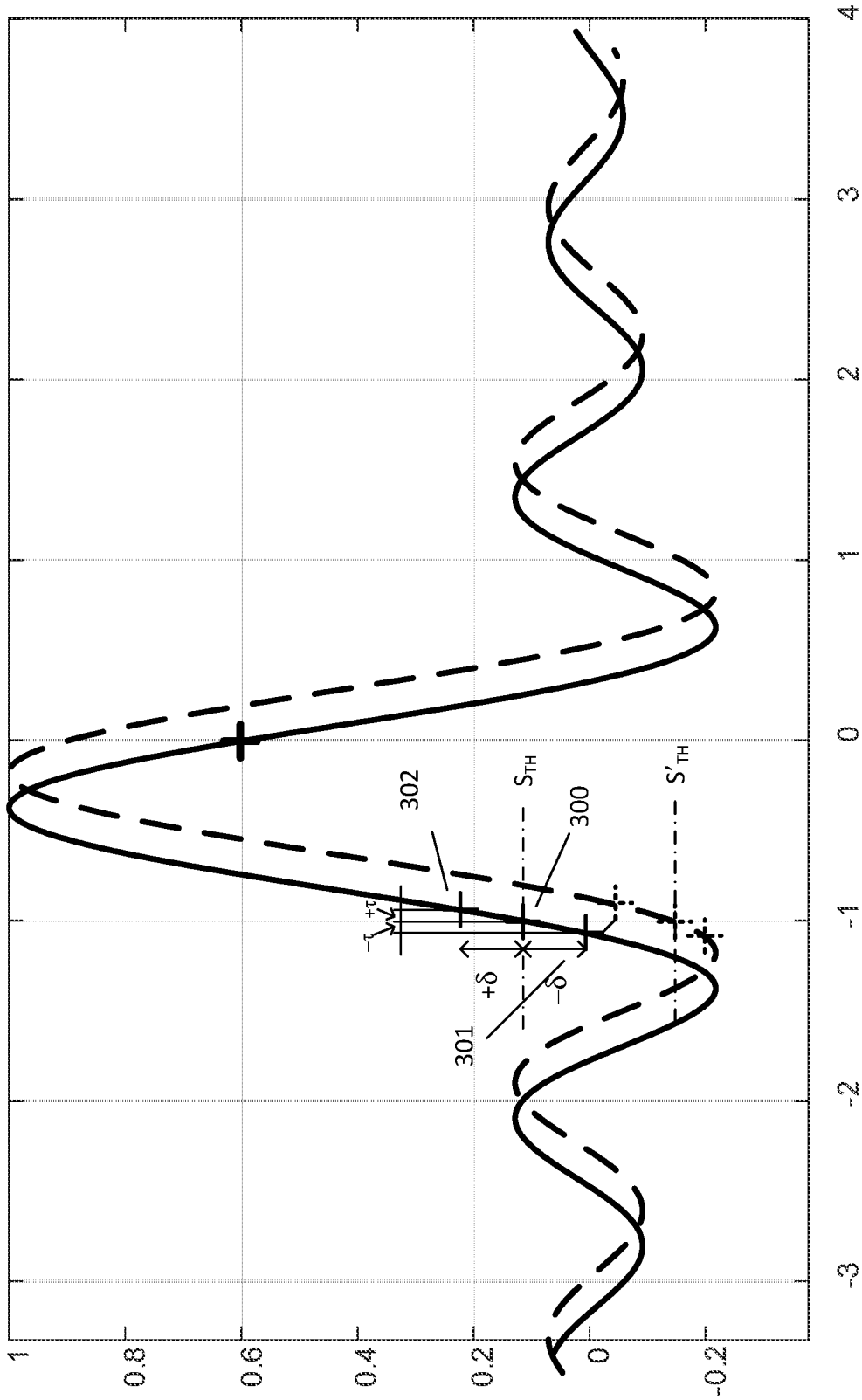
FIG. 3 illustrates the operation of an example TED as a function of the incoming impulse response waveforms.

FIG. 3 illustrates the operation of an example TED as a function of the incoming impulse response waveforms. The optimal sampling point is obtained when the TED output is 0 and the equilibrium point is stable. If the impulse signal is correctly sampled, the impulse response h[−1] 300 equals to the threshold $S_{TH}$. However, if the impulse signal is sampled early (or late), the impulse response h[−1] 301 (or 302) is δ less than (or greater than) the threshold $S_{TH}$. In these two cases, the TED outputs opposite signs, which generates a phase error at the TED output for correcting the sampling phase as described in connection with FIG. 1. Adjusting the threshold $S_{TH}$ to $S'_{TH}$ will change the sampling time.

Upon reading this disclosure, those of skill in the art will appreciate still additional alternative designs. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

The invention claimed is:

1. A receiver system comprising:
   a filter configured to generate a filtered signal based on a digital signal;
   a slicer configured to generate a series of symbols based on the filtered signal; and
   a timing detector comprising a first input terminal and a second input terminal, the first input terminal being coupled to the slicer to receive the series of symbols, the second input terminal being configured to receive a difference signal, the timing detector being configured to generate a timing adjustment using the series of symbols and the difference signal;
   wherein a value of the timing adjustment for a current symbol period is a multiplication of a value of the series of symbols at a previous symbol period and a value of the difference signal at a current symbol period.

2. The system of claim 1 further comprising an analog-to-digital converter (ADC) for generating the digital signal based on a received data signal.

3. The system of claim 2 further comprising a clock generator for generating a local clock signal, the ADC being driven by the local clock signal.

4. The system of claim 3 wherein the clock generator is configured to adjust the local clock signal based on the timing adjustment generated by the timing detector.

5. The system of claim 4 further comprising a digital-to-analog converter for generating a control voltage based on the timing adjustment.

6. The system of claim 1 wherein the filter comprises a feedforward equalizer.

7. The system of claim 1 wherein the timing detector comprises a first delay circuit coupled to the slicer.

8. The system of claim 1 wherein the timing adjustment is configured to adjust rising edges of a clock signal.

9. The system of claim 1 wherein the timing detector comprises a first delay circuit to store a current symbol of the series of symbols.

10. The system of claim 9 wherein the timing detector further comprises a second delay circuit to store a previous symbol of the series of symbols.

11. The system of claim 1 wherein the difference signal is a difference between the filtered signal and a corresponding symbol.

12. A receiver system comprising:
   an analog to digital converter configured to convert a received signal to a digital signal at a clock rate;
   a filter configured to generate a filtered signal based on the digital signal;
   a slicer configured to generate a series of symbols based on the filtered signal; and
   a timing detector comprising a first input terminal a second input terminal, the first input terminal being coupled to the slicer to receive the series of symbols, the second input terminal being configured to receive a difference signal, the timing detector being configured to generate a timing adjustment using the series of symbols and the difference signal, the timing detector further comprising a delay circuit for storing a current symbol of the series of symbols; and
   a clock generator configured to generate the clock rate and adjust the clock rate using the timing adjustment,
   wherein the timing adjustment is determined according to:
   $$p\Delta[k]=(d[k]-\tilde{d}[k])*d[k-1]-S_{TH},$$

where $p\Delta[k]$ is the timing adjustment, $d[k]$ is a symbol corresponding to a $k^{th}$ clock cycle from among the series of symbols, $\tilde{d}[k]$ is the digital signal used to generate $d[k]$, and $S_{TH}$ is a predetermined sampling threshold.

13. The system of claim 12 further comprising a digital to analog converter configured to generate a control voltage for the clock generator based on the timing adjustment.

14. The system of claim 13 wherein the filter comprises a feedforward equalizer.

15. The system of claim 12 wherein the time adjustment comprises a phase error signal.

16. The receiver of claim 12, where the predetermined sampling threshold $S_{TH}$ is zero.

17. A receiver system comprising:
a filter configured to generate a filtered signal based on a digital signal;
a slicer configured to generate a series of symbols based on the filtered signal; and
a timing detector comprising a first input terminal and a second input terminal, the first input terminal being coupled to the slicer to receive the series of symbols, the second input terminal being configured to receive a difference signal, the timing detector being configured to generate a phase error signal using a multiplication of a symbol of the series of symbols and a corresponding difference signal; and
a clock generator configured to generate the clock rate and adjust the clock rate using the phase error signal,
wherein the timing adjustment is determined according to:
$p\Delta[k]=(d[k]-\tilde{d}[k])*d[k+1]$,
where $p\Delta[k]$ is the timing adjustment, $d[k]$ is a symbol corresponding to a $k^{th}$ clock cycle from among the series of symbols, $\tilde{d}[k]$ is the digital signal used to generate $d[k]$.

18. The system of claim 17 wherein the phase error signal is a function of a sampling threshold value. .

* * * * *